(12) United States Patent
Nabizada et al.

(10) Patent No.: US 12,286,020 B2
(45) Date of Patent: Apr. 29, 2025

(54) DISENGAGEMENT OF ELECTRIC VEHICLE CHARGING CABLE

(71) Applicant: SPEED CHARGE, LLC, Carter Lake, IA (US)

(72) Inventors: Jamshed Nabizada, Fremont, CA (US); Ravi Lavu, Fremont, CA (US); Anton Cwik, Fremont, CA (US); Ajay Somepalli, Fremont, CA (US)

(73) Assignee: SPEED CHARGE, LLC, Carter Lake, IA (US)

( * ) Notice: Subject to any disclaimer, the term of this patent is extended or adjusted under 35 U.S.C. 154(b) by 0 days.

(21) Appl. No.: 18/142,218

(22) Filed: May 2, 2023

(65) Prior Publication Data

US 2024/0067014 A1     Feb. 29, 2024

Related U.S. Application Data

(63) Continuation of application No. 17/822,278, filed on Aug. 25, 2022, now Pat. No. 11,685,278.

(51) Int. Cl.

| | |
|---|---|
| *H02J 7/00* | (2006.01) |
| *B60L 53/30* | (2019.01) |
| *B60W 10/26* | (2006.01) |
| *H02J 7/14* | (2006.01) |
| *B60L 53/16* | (2019.01) |
| *B60L 53/18* | (2019.01) |

(52) U.S. Cl.
CPC ........... *B60L 53/305* (2019.02); *B60W 10/26* (2013.01); *B60L 53/16* (2019.02); *B60L 53/18* (2019.02); *B60L 2240/549* (2013.01); *B60L 2250/16* (2013.01)

(58) Field of Classification Search
CPC ......... B60L 53/305; B60L 53/16; B60L 53/18
USPC ........................................................ 320/109
See application file for complete search history.

(56) References Cited

U.S. PATENT DOCUMENTS

| | | | |
|---|---|---|---|
| 2011/0106329 A1* | 5/2011 | Donnelly ............... | B60L 53/665 320/109 |
| 2011/0279082 A1* | 11/2011 | Hagenmaier, Jr. ...... | B60L 53/18 320/109 |
| 2012/0161700 A1* | 6/2012 | Chiang ..................... | B60L 3/04 320/109 |
| 2014/0170880 A1* | 6/2014 | Doi ......................... | B60L 53/305 439/305 |

(Continued)

*Primary Examiner* — Alexis B Pacheco
(74) *Attorney, Agent, or Firm* — MARSHALL, GERSTEIN & BORUN LLP

(57) ABSTRACT

In order to ensure safe and reliable disconnection of charging cables from electric vehicles during occurrence of error conditions preventing normal disengagement of such charging cables, the systems and methods disclosed herein provide a vehicle charging system including a system controller configured to present via a display a user-selectable manual disconnection option when the vehicle is not receiving a charging current, receive an indication of a user selection of the manual disconnection option, and control a charge controller of the vehicle charging system to reset in order to terminate any charging session and to disengage the charging cable. In some embodiments, the charge controller may be configured or controlled to send a session termination signal to a vehicle charge controller of the vehicle either before resetting or as part of a startup process.

20 Claims, 5 Drawing Sheets

(56) References Cited

U.S. PATENT DOCUMENTS

| | | |
|---|---|---|
| 2015/0022152 A1 | 1/2015 | Nakagawa et al. |
| 2015/0151740 A1* | 6/2015 | Hynes ............... B60L 58/12 |
| | | 701/29.2 |
| 2016/0001667 A1* | 1/2016 | Masuda ............ B60L 50/16 |
| | | 180/65.225 |
| 2018/0236889 A1 | 8/2018 | Masuda |
| 2019/0210468 A1 | 7/2019 | Wittl |
| 2019/0366851 A1 | 12/2019 | Moy et al. |
| 2020/0108819 A1 | 4/2020 | Revach et al. |
| 2021/0053454 A1 | 2/2021 | Morich et al. |
| 2021/0178902 A1* | 6/2021 | Liu ............... H01M 10/6552 |
| 2024/0067014 A1* | 2/2024 | Nabizada ............ B60L 53/11 |

\* cited by examiner

DISENGAGEMENT OF ELECTRIC VEHICLE CHARGING CABLE

CROSS-REFERENCE TO RELATED APPLICATION

This application is a continuation of U.S. patent application Ser. No. 17/822,278, filed Aug. 25, 2022, the disclosure of which is hereby incorporated herein by reference in its entirety.

TECHNICAL FIELD

At least one aspect generally relates to improvements to vehicle charging stations generally and more particularly to improvements in safely and reliably disengaging charging cables from vehicles in instances of error conditions in the charger or vehicle that prevent disengagement in the ordinary course following completion of charging.

BACKGROUND

Charging stations provide electric power to electric vehicles (EVs), including plug-in hybrid vehicles, that can operate without the use or with limited use of hydrocarbon-based fuels. When connected through a charging cable or other electrical coupling, such vehicles receive and store electric power from the charging stations during charging sessions for use in powering the vehicles following such charging sessions. Charging cable connections with the vehicles are locked during charging sessions in order to prevent injury and damage from disconnection while a high-power current exists in the charging cable, which could result in current arcing or grounding. Upon completion of a charging session, the locking mechanisms are disabled to allow a user to disengage the charging cable from the vehicle or the charging station. Errors can occur in the control software controlling the charging session, in communication connections between the charger and the vehicle, or in sensors within the charging station or the vehicle. Such errors can result in a failure to recognize the end of a charging session by one or both of the charging station or the vehicle. While some vehicles have manual releases that may be activated by a user to unlock the charging cable, such releases are typically difficult to access due to safety concerns relating to accidental release. Driver frustration resulting from the inability to disconnect charging cables and from inaccessibility of charging stations when such errors occur has a detrimental impact on adoption of electric and charging hybrid vehicles. Therefore, improved techniques for safely and reliably providing a manual release for charging cables are needed.

SUMMARY

The systems, methods, and computer-readable instructions disclosed herein solve the problem of safely and reliably providing a manual release for charging cables through a user-selectable manual disconnection option that, when selected by a user of a vehicle charging system, cause a charge controller of the vehicle charging system to reset in order to ensure termination of any ongoing charging sessions and to enable disconnection of charging cables from vehicles even under error conditions. As described herein, a vehicle charging system for charging a vehicle is provided, the vehicle charging system comprising: a power input port configured to receive input electrical power from a power source; a coupling configured to receive a charging current associated with the input electrical power and to provide an electrical interconnect between the vehicle charging system and the vehicle in order to provide the charging current to the vehicle; a charge controller; and a system controller. The coupling may comprise a charging cable of the vehicle charging system, including a communication connection and a power connection. In some embodiments, the vehicle charging system further comprises a display communicatively connected to the system controller, which may incorporate or be connected to an input component, such as a touchscreen display or a display disposed with one or more mechanical input buttons.

The charge controller includes one or more logic circuits configured to: establish a charging session between the vehicle charging system and the vehicle via electronic communication with a vehicle charge controller of the vehicle; and control supply of the charging current to the coupling in order to provide the charging current to the vehicle during the charging session. The charge controller is configured such that it may be controlled to be reset by the system controller. Resetting the charge controller may include causing the charge controller to proceed through a power cycle process in order to reboot or restart the charge controller. In some embodiments, the charge controller is configured such that the charging session automatically terminates when the charge controller is reset. In further embodiments, the charge controller is configured such that the charge controller automatically disconnects the charging current from the coupling when the charge controller is reset. The charge controller may be further configured to send session termination signals to the vehicle charge controller of the vehicle via a communication connection of the coupling, either prior to resetting or as part of a startup process.

The system controller includes one or more processors configured to: receive an indication of a user selection of a manual disconnection option at an input component of the vehicle charging system from a user of the vehicle charging system; and control the charge controller to reset in order to disengage the coupling from the vehicle in response to receiving the indication of the user selection of the manual disconnection option. In some embodiments, the system controller is configured to control the charge controller to send a session termination signal to the vehicle in response to receiving the indication of the user selection of the manual disconnection option and prior to controlling the charge controller to reset. In further embodiments, the system controller is further configured to present a user-selectable button representing the manual disconnection option to a user via a display communicatively connected to the system controller. In some such embodiments, the user-selectable button is presented only when the charging current is disconnected from the coupling.

Methods or computer-readable media storing instructions for implementing all or part of the vehicle charging system described above may also be provided in some aspects in order to provide or operate a vehicle charging station. Additional or alternative features described herein below may be included in some aspects.

DETAILED DESCRIPTION

The techniques disclosed herein generally relate to solving the problem of providing safe and reliable manual disconnection options for disengaging vehicles from charging stations following completion of charging sessions. Although automatically managed by the charging station and the vehicle under ordinary conditions, errors can prevent the automatic release of locking mechanisms in some instances. Such error states are not only disruptive to drivers and passengers of the affected vehicle but also prevent charging other vehicles at the charging station until resolved. The systems, methods, and executable instructions stored in computer-readable media described herein solve this problem for all types of vehicles by providing a manual disconnection option at the charging station. In a first aspect, the manual disconnection option facilitates the disengagement of the charging cable by controlling a charge controller within the charging station to reset, thereby terminating the charging session and unlocking the charging cable. In a second aspect, the manual disconnection option additionally or alternatively facilitates the disengagement of the charging cable by sending a session termination signal to a vehicle charge controller within the vehicle to indicate termination of the charging session and unlock the charging cable. Additional or alternative features are described in further detail below.

Several aspects of electric vehicle (EV) or plug-in hybrid vehicle charging systems will now be presented with reference to various embodiments. Although described herein as relating to EVs, it should be understood that the techniques may be applied equally to plug-in hybrid vehicles or other wholly or partially battery-powered devices that may be charged by a high-voltage or high-power charging station. Charging stations are used for recharging batteries in EVs by supplying alternating current (AC) or direct current (DC) power to EVs. In turn, the charging stations receive an electric power supply from a utility power grid connection or local power source (e.g., solar, wind, water, or hydrocarbon-powered power generation systems). Some charging stations may store power in one or more internal or connected batteries in order to smooth power consumption over time. However configured, charging stations include a charging cable or other electrical coupling to provide power to EVs during charging sessions. In some embodiments, such coupling comprises a plug into which a charging cable may be inserted to connect an EV to the charging station, thereby offering greater flexibility in the type of charging cables and connectors used by various types of EVs.

Figure 1:
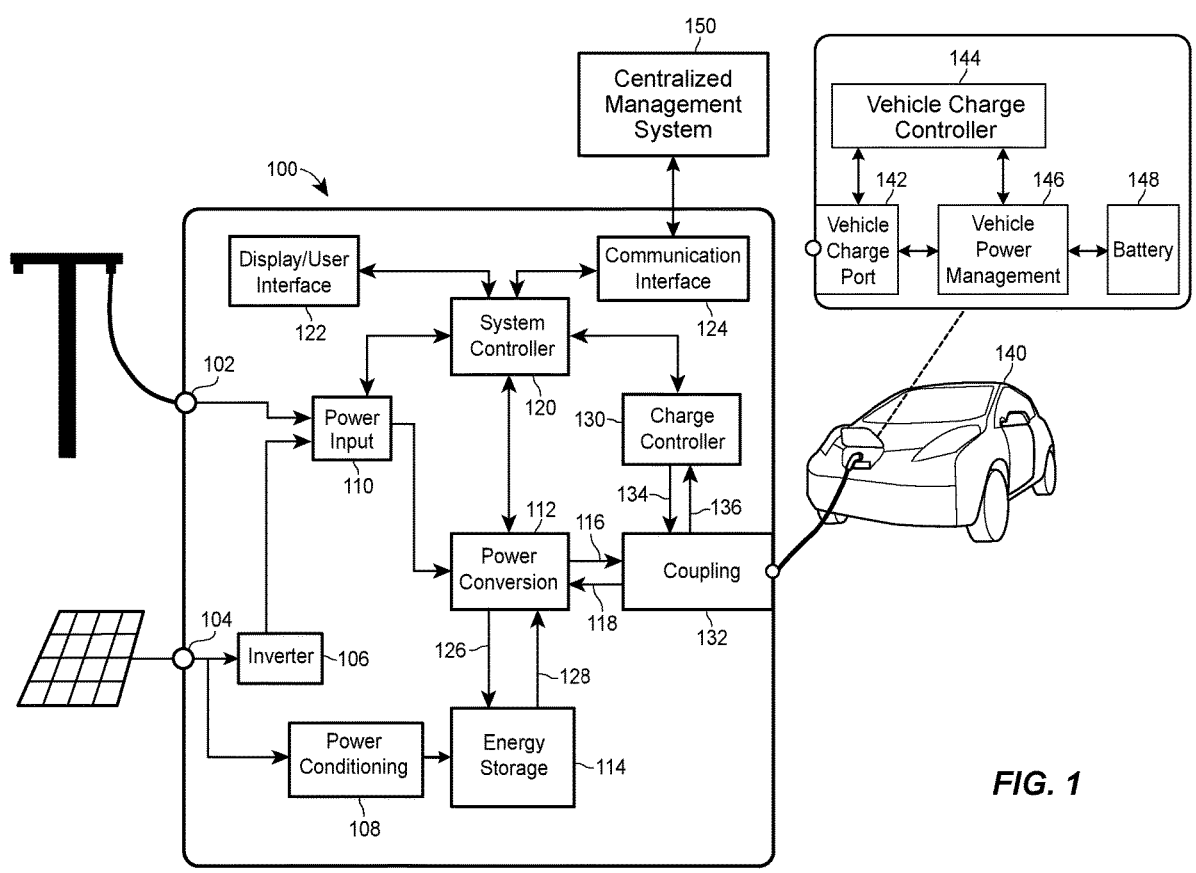
FIG. 1 illustrates a block diagram of an example of an electric vehicle charging system configured in accordance with certain aspects disclosed herein.

FIG. 1 illustrates a block diagram of an example of an EV charging system 100 configured in accordance with certain aspects disclosed herein. The EV charging system 100 is configured to receive electric power from a power source via an input port 102 or 104 and provide a charging current to a vehicle 140 in order to charge a battery 148 of the vehicle 140. Such charge is provided through a coupling 132, which may comprise a charging cable utilizing one or more standard connector types (e.g., combined charging system (CCS) or CHaDEMO). Although the illustrated EV charging system 100 includes power conversion 112 and energy storage 114 in order to store and provide a DC current to the vehicle 140, alternative charging systems need not include such components. Likewise, although illustrated as communicating with a centralized management system 150, alternative embodiments of the EV charging system 100 need not be configured for such external communication. Additional or alternative components and functionality may be included in further alternative embodiments of charging systems.

The EV charging system 100 includes a power input module 110 having one or more circuits configurable to transform, condition or otherwise modify power received from an input port 102 or 104 to provide conditioned power to a power conversion module 112. The input power received at input ports 102 or 104 may be received from an electric utility power grid, a local power generator (e.g., a solar power generator), a local power storage (e.g., an external battery), or any other power source. Input AC power may be received at AC input port 102. In some embodiments, input DC power may be received at a DC input ports 104, such as may be provided by photovoltaic panels or other types of DC power sources, including external battery systems. The DC input port 104 may be connected to an inverter module 106 or a power conditioning module 108 for the input DC power. In one example, DC current received via DC input port 104 may be converted to an AC current by an inverter module 106, and the AC current may be provided to power input module 110. The power input module 110 may combine AC current received from multiple sources. The power input module 110 may direct AC current received from multiple sources to individual circuits or sections of the power conversion module 112. In another example, DC current received via DC input port 104 may be provided to a power conditioning module 108 that may include voltage level converting circuits, filters and other conditioning circuits to provide a charging current to the energy storage module 114.

The power conversion module 112 includes an AC-to-DC conversion circuit that generates a DC energy storage current 126 that is provided to an energy storage module 114. In one example, the energy storage module 114 includes high-capacity batteries that have a storage capacity greater than a multiple of the storage capacity in the EVs to be charged (e.g., three times, five times, or ten times an expected vehicle battery capacity). The storage capacity of the energy storage module 114 may be configured based on the expected average charge per charging event, which may depend upon factors such as the types of vehicles charged, the depletion level of the vehicle batteries when charging starts, and the duration of each charging event. For example, a retail parking site may have more charging events of shorter duration, while a commuter train parking lot may have fewer charging events of longer duration. In various examples, the storage capacity of the energy storage module 114 may be configured based on maximum expected charging offset by power received from an electric utility. In some of these examples, the power received from an electric utility may be limited to power available during low-demand times, such as off-peak or low-priced periods of the day. The power input module 110 may be configured to block or disconnect inflows of power during peak or high-priced periods of the day. In some instances, the power input module 110 may be configured to enable power reception during peak periods to ensure continued operation of the EV charging system 100 when power levels in the energy storage module 114 are unexpectedly low.

In some embodiments, the power conversion module 112 may include one or more DC-to-DC conversion circuits that receive DC current 128 at a first voltage level from the energy storage module 114 and drive a charging current 116 to a vehicle 140 through a coupling 132 to supply a vehicle 140 with the charging current 116 via a vehicle charge port 142. The coupling 132 serves as an electrical interconnect between the EV charging system 100 and the vehicle 140. In various embodiments, such coupling 132 comprises a charging head and/or a charging cable. For example, the coupling 132 may comprise a charging cable having a standard-compliant plug for connection with a vehicle charge port 142 of vehicles 140. The coupling 132 may include both a power connection for carrying the charging current 116 and a communication connection for carrying electronic communication between the charge controller 130 and the vehicle 140. In some embodiments, the EV charging system 100 may comprise multiple couplings 116, and the power conversion module 112 may include a corresponding number of DC-to-DC conversion circuits specific to each of the multiple couplings. According to some embodiments, the power conversion module 112 may be further configured to receive a reverse current 118 from a vehicle 140 via the coupling 132, which reverse current 118 may be used to provide a DC energy storage current 126 to add energy to the energy storage module 114. In some examples, the power conversion module 112 includes one or more inverters that convert the DC current 128 to an AC current that can be provided as the charging current 116.

In further embodiments, the power conversion module 112 includes some combination of AC-to-DC, DC-to-DC and/or DC-to-AC converters that enables efficient conversion of AC input power received from a power utility or other source at input port 102 or 104 to a DC energy storage current 126 provided to the energy storage module 114, which stores the power until needed to provide a charging current 116 to a vehicle 140. In one example an inverter may be configured to achieve greater efficiency and cost effectiveness while enabling at least 150 kW charging levels, in contrast to the 120 kW levels provided by other systems. In some instances, the EV charging system 100 can provide an output current at or above 1000 volts that can match higher battery voltages used in some vehicles 140. The higher voltage levels can enable faster, more efficient charging.

A charge controller 130 controls the charging current 116 and/or reverse current 118 through each coupling 132. To control charging or discharging of the vehicle 140, the charge controller 130 comprises one or more logic circuits (e.g., general or special-purpose processors) configured to execute charging control logic to manage charging sessions with vehicle 140. Thus, the charge controller 130 is configured to communicate with the system controller 120 to control the power conversion module 112 to provide the charging current 116 to the vehicle 140 or to receive the reverse current 118 from the vehicle 140 via the coupling 132. In some instances, the charge controller 130 may include power control circuits that further modify or control the voltage level of the charging current 116 passed through the coupling 132 to the vehicle 140. The charge controller 130 also communicates via the coupling 132 with a vehicle charge controller 144 within the vehicle 140 to manage vehicle charging. Thus, the charge controller 130 communicates with the vehicle charge controller 144 to establish, control, and terminate charging sessions according to EV charging protocols (e.g., CCS or CHaDEMO). The charge controller 130 may be communicatively connected with the coupling 132 to provide output signals 134 to the vehicle charge controller 144 and to receive input signals 136 from the vehicle charge controller 144.

According to various embodiments, the charge controller 130 is configured to control the supply of the charging current 116 such that the charging current 116 is disconnected from the coupling 132 and/or to terminate any ongoing charging sessions automatically whenever the charge controller 130 is disconnected or reset. This enables the vehicle 140 to be safely disengaged from the EV charging system 100 whenever the charge controller 130 is reset. In some embodiments, the charge controller 130 and the system controller 120 are configured such that the system controller 120 only controls the power conversion circuit 112 to provide the charging current 116 to the coupling 132 while the system controller 120 receives a charging signal from the charge controller 130, thus automatically disconnecting the charging current whenever the charge controller 130 is rest. In further embodiments, the charge controller 130 may be configured to directly control a relay or switch to disconnect the charging current 116 from the coupling 132 whenever the charge controller 130 is reset or loses power. In some embodiments, the charge controller 130 is configured to terminate all active charging sessions automatically when the charge controller 130 is resets. Automatically terminating a charging session may include sending a session termination signal to the vehicle charge controller 144 as part of a shutdown or startup process. Additionally or alternatively, disconnecting the charge controller 130 from the vehicle charge controller 144 while resetting the charge controller 130 may automatically terminate the charging session.

A system controller 120 is configured to control operations of the EV charging system 100 by implementing control logic using one or more general or special-purpose processors. The system controller 120 is configured to monitor and control power levels received by the power input module 110, power levels output through the charging current 116, and energy levels in the energy storage module 114. The system controller 120 is further configured to communicate with and control each of the one or more charge controllers 130, including controlling the charge controller 130 to reset in response to receiving a user selection of a manual disconnection option. The system controller 120 may also monitor temperatures within the EV charging system 100 and/or within different components of the EV charging system 100 and may be configured to mitigate increases in temperature through active cooling or power reductions. The system controller 120 is further configured to control aspects of operation of the one or more charge controllers 130, as well as controlling the power conversion module 112 to supply the charging current 116 in response to instructions from the charge controller 130. The system controller 120 further communicates with a user interface module 122 (e.g., a touchscreen display) and a communication interface module 124 (e.g., a network interface controller) to provide information and receive control commands.

The system controller 120 is configured to communicate with the components of the EV charging system 100, including power input module 110, power conversion module 112, the user interface module 122, the communication interface module 124, and the charge controller 130 over one or more data communication links. The system controller 120 may also be configured to communicate with controllers or sensors coupled to the energy storage module 114, other components of the EV charging system 100, or external devices, including a vehicle 140 via the coupling 132. The system controller 120 may manage, implement or support one or more data communication protocols used to control communication over the various communication links. The data communication protocols may be defined by industry standards bodies or may be proprietary protocols.

The user interface module 122 is configured to present information related to the operation of the EV charging system 100 to a user and to receive user input. The user interface module 122 may include or be coupled to a display with capabilities that reflect intended use of the EV charging system 100. In one example, a touchscreen may be provided to present details of charging status and user instructions, including instructions describing the method of connecting and disconnecting a vehicle 140. The user interface module 122 may include or be coupled to a touchscreen that interacts with the system controller 120 to provide additional information or advertising. The system controller 120 may include or be coupled to a wireless communication interface that can be used to deliver a wide variety of content to users of the EV charging system 100, including advertisements, news, point-of-sale content for products/services that can be purchased through the user interface module 122. The display system may be customized to match commercial branding of the operator, to accommodate language options and for other purposes.

Through the user interface module 122, the system controller 120 may provide information to enable the user to start charging, to confirm the start of charging, to track the status of charging, and to end charging. As discussed further below, the user interface module 122 is further configured to present a manual disconnection option to the user in order to facilitate disconnection of the coupling 132 and the vehicle 140. Such manual disconnection option may be presented as a user-selectable virtual button on a touchscreen or as a physical button of the EV charging system 100 that may be actuated by a user. The user interface module 122 may include or be connected to various input components, including touchscreen displays, physical input mechanisms, identity card readers, touchless credit card readers, and other components that interact through direct connections or wireless communications. The user interface module 122 may further support user authentication protocols and may include or be coupled to biometric input devices such as fingerprint scanners, iris scanners, facial recognition systems and the like.

In some embodiments, the energy storage module 114 is provisioned with a large battery pack and the system controller 120 is controlled by software that is configured to manage input received from an electrical power grid to the battery pack such that power is drawn from the grid to charge the battery pack at low-cost time periods and to avoid drawing power from the grid during peak-cost hours. The software may be further configured to manage power output to provide full, fast charging power in accordance with usage generated by monitoring patterns of usage by the EV charging system 100. The use of historical information can avoid situations in which the battery pack becomes fully discharged or depleted beyond a minimum energy threshold. For example, charging may be limited at a first time based upon a predicted later demand at a second time, which later demand may be predicted using historical information. This may spread limited charging capacity more evenly among vehicle throughout the course of a day or in other situations in which battery pack capacity is expected to be insufficient to fully charge all EVs over a time interval, taking account of the ability to add charge to the energy storage module 114.

In some embodiments, the EV charging system 100 may be configured with two or more couplings 132 to enable concurrent charging of multiple vehicles 140. The system controller 120 may be configured by a user via the user interface module 122 to support multiple modes of operation and may define procedures for power distribution that preserve energy levels in the energy storage module 114 when multiple vehicles 140 are being concurrently charged. Distribution of power may be configured to enable fast charging of one or more vehicles 140 at the expense of other vehicles 140. In this regard, the couplings 132 may be prioritized or the system controller 120 may be capable of identifying and prioritizing connected vehicles 140. In some instances, the system controller 120 may be configured to automatically control the respective charge controllers 130 to split available power between two vehicles 140 after the second vehicle 140 is connected. The available power may be evenly split between two vehicles 140 or may be split according to priorities or capabilities. In some examples, the system controller 120 may conduct arbitration or negotiation between connected vehicles 140 to determine a split of charging capacity. A vehicle 140 may request a charging power level at any given moment based on temperature, battery charge level, and other characteristics of the vehicle 140 and its environment and to achieve maximum charge rate and minimum charging time for the current circumstances.

In accordance with certain aspects of this disclosure, a centralized management system 150 may communicate with multiple EV charging systems 100, including EV charging systems 100 that are deployed in locations separated by large geographic distances. Such centralized management system 150 may comprise one or more servers configured to receive operating data from and to send data and/or control commands to each of the EV charging systems 100. To facilitate communication, the centralized management system 150 may be communicatively connected to the system controller 120 of each EV charging system 100 via an electronic communication link with a communication interface module 124 within each EV charging system 100. Each communication interface module 124 may be configured to send and receive electronic messages via wired or wireless data connections, which may include portions of one or more digital communication networks. For example, the centralized management system 150 may communicate with EV charging systems 100 located in different parking facilities, on different floors of the same parking structure, or in different cities.

The centralized management system 150 may group or relate EV charging systems 100 according to their location, their intended function, availability, operating status and capabilities. The centralized management system 150 may remotely configure and control the EV charging systems 100. The centralized management system 150 may remotely enforce regulations or requirements governing the operation of the EV charging systems 100. The centralized management system 150 may remotely interact with users of the EV charging systems 100. The centralized management system 150 may remotely manage billing, maintenance, and error detection for each of the EV charging systems 100. For example, error conditions resulting in manual disconnection of a vehicle 140 from an EV charging system 100 may be reported by the EV charging system 100 to the centralized management system 150 for analysis. The centralized management system 150 may also communicate with mobile communication devices of users of the EV charging systems 100. The centralized management system 150 may communicate with mobile communication devices or other computing devices used by operators of the EV charging systems 100 to enable the operator to self-configure the EV charging systems 100, charge pricing, language localization, currency localization, and so on. In some embodiments, such user devices may present a user-selectable manual disconnection option to a user, allowing a user to manually control disengagement of the vehicle 140 from the EV charging system 100 via communication through the centralized management system 150.

As illustrated, a vehicle 140 may be charged by connecting the vehicle 140 to the EV charging system 100 via a coupling 132. This may include plugging a charging cable of the EV charging system 100 into a vehicle charge port 142 of the vehicle 140. The vehicle charge port 142 is configured to receive the charging current 116 through the coupling 132 and provide such received current to a vehicle power management module 146. The vehicle charge port 142 is further configured to provide an electronic communication connection between the coupling 132 and a vehicle charge controller 144, which controls charging of the vehicle 140. The vehicle charge management module 146 is controlled by the vehicle charge controller 144 to provide power to each of one or more batteries 148 of the vehicle 140 in order to charge such battery 148. In some instances, the vehicle charge port 142 includes a locking mechanism to engage and retain a portion of the coupling 132 in place during charging sessions. For example, for safety reasons, the vehicle charge controller 144 may control a locking mechanism of the vehicle charge port 142 to lock a plug of a charging cable in the vehicle charge port 142 while a charging session is active. When an error state prevents the vehicle charge controller 144 from recognizing the end of a charging session or when the charge controller 130 fails to terminate a charging session when charging is complete, the locking mechanism may not disengage. Thus, such an error state requires a manual disconnection in order to disengage the coupling 132 from the vehicle charge port 142.

Figure 2:
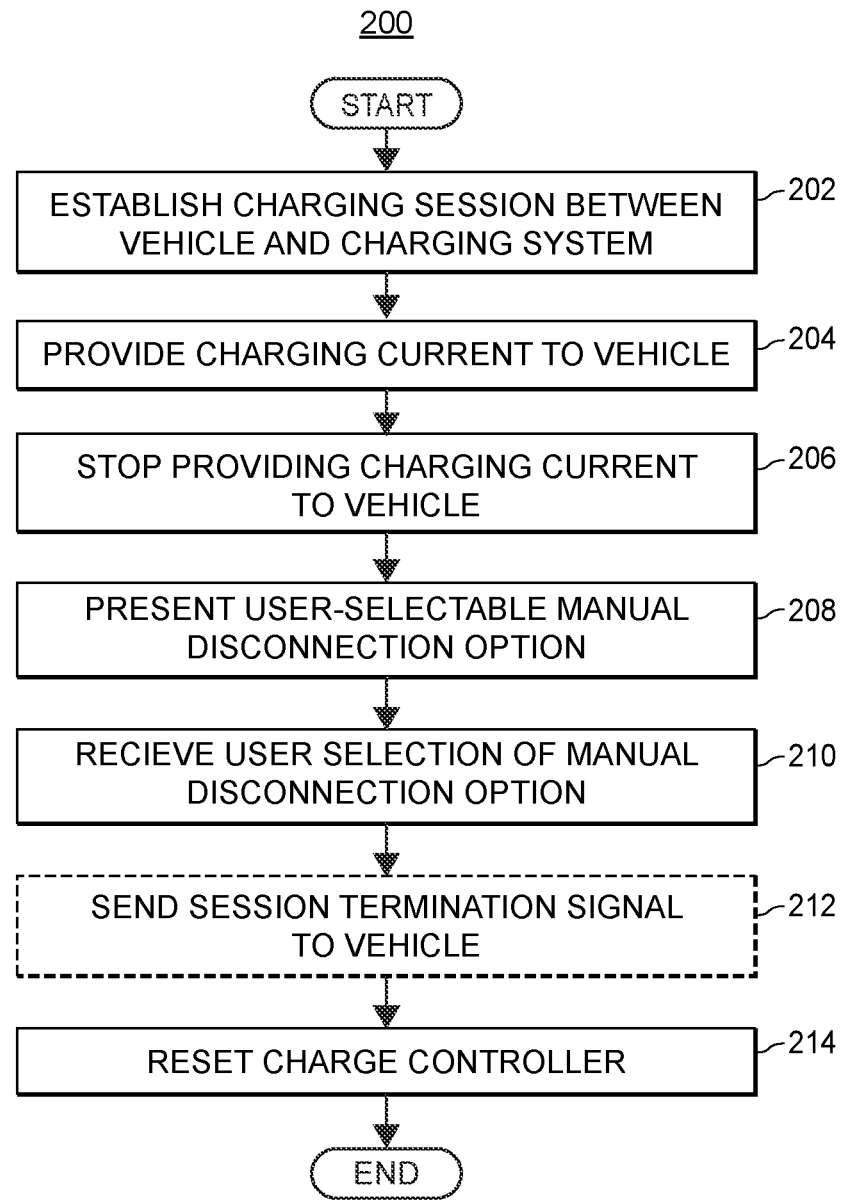
FIG. 2 illustrates a flow diagram of an example of a charging cable disengagement method for disconnecting a charging cable or other coupling from a vehicle by a manual disconnection option upon completion of a charging session in accordance with certain aspects disclosed herein.

FIG. 2 illustrates a flow diagram of an example of a charging cable disengagement method 200 for disconnecting a charging cable or other coupling from a vehicle by a manual disconnection option upon completion of a charging session. The exemplary method 200 may be implemented by an EV charging system 100 to facilitate disengagement of a coupling 132 from a vehicle 140 in the presence of an error condition. Although described with reference to the EV charging system 100, the exemplary method 200 may be implemented by any charging system to disengage or enable disengaging any charging cable or other coupling from any vehicle or other similar high-power device following charging. By such method, the vehicle or other device may be safely and reliably disconnected from the charging system, even when an error occurs. Additional or alternative aspects or features may be included in alternative embodiments.

The charging cable disengagement method 200 begins with the establishment of a charging session via electronic communication between the charging system and a vehicle to be charged (block 202). During the charging session, the charging system provides a charging current to the vehicle via a charging cable or similar coupling in order to charge a battery within the vehicle (block 204). When the charging system stops providing the charging current to the vehicle (block 206), the charging system presents a user-selectable manual disconnection option to a user (block 208). Such manual disconnection option enables the user to cause the manual disengagement of the charging cable from the vehicle in the event an error prevents disconnection in the ordinary course. When the charging system receives an indication of a user selection of the manual disconnection option (block 210), the charging system takes further actions to ensure the charging session is terminated and to disengage or facilitate disengagement of the charging cable from the vehicle. In some embodiments, such actions include sending a session termination signal to a vehicle charge controller of the vehicle via a communication connection of the charging cable (block 212). Additionally or alternatively, the charging system resets a charge controller associated with the charging session in order to cause the disengagement of the charging cable from the vehicle (block 214). Once the charge controller is reset, the charging system returns to its initial state and is ready to begin another charging session.

At block 202, the charging system (e.g., EV charging system 100) establishes a charging session with the vehicle (e.g., vehicle 140). Such charging session may be initiated by the charging system or the vehicle by the exchange of electronic messages or signals via a communication connection of a charging cable (or other coupling 132) after the charging cable is plugged into the vehicle. Upon establishing the charging session, the vehicle or charging system may cause a locking mechanism of a vehicle charge port to engage in order to ensure the charging cable remains connected to the vehicle during charging for safety reasons (e.g., by retaining a plug of the charging cable within a vehicle charge port 142 of the vehicle 140). The charging session may be established and controlled by a charge controller (e.g., charge controller 130) of the charging system. The charge controller may communicate with a vehicle charge controller (e.g., vehicle charge controller 144) of the vehicle via the communication connection of the charging cable to exchange electronic signals or messages.

At block 204, the charging system provides a charging current (e.g., charging current 116) to the vehicle via the charging cable during the charging session in order to charge a battery of the vehicle. The charge controller may control the supply of the charging current to the vehicle by communication with a system controller (e.g., system controller 120), which may in turn control additional components of the charging system (e.g., components such as a power conversion module 112) to provide the charging current to a power connection of the charging cable. During the charging session, the charge controller may control the supply of the charging current to the vehicle via the charging cable by periodically sending charging signals to the system controller in order to cause the system controller to connect an appropriate charging current to the charging cable (e.g., by controlling the charging current 116 by controlling the power conversion module 112). The charge controller further communicates with the vehicle charge controller of the vehicle during the charging session in order to maintain appropriate charging conditions, such as by monitoring the charge level of the vehicle's battery.

At block 206, the charging system stops providing the charging current to the vehicle. The charging system may stop supplying the charging current when the vehicle is sufficiently charged, upon reaching a charging time threshold, upon depletion of charge stored at the charging system, in response to receipt of a user instruction to stop charging, or upon occurrence of some other event. A command to stop charging may be generated by the charge controller or received by the charge controller from the vehicle charge controller. When the charge controller determines charging should end, it may send a signal to the system controller or may simply stop sending periodic charging signals to the system controller in order to cause the system controller to stop supplying a charging current to the charging cable. In some embodiments, the charge controller may attempt to provide a charging session termination signal to the vehicle charge controller via the communication connection of the charging cable, but such session termination signal may not be received by or recognized by the vehicle charge controller due to an error. For example, a firmware update may create an unexpected error preventing proper handling of a session termination signal under some conditions.

At block 208, the charging system presents a user-selectable manual disconnection option to the user. Presentation of such manual disconnection option may be controlled by the system controller of the charging system. In some embodiments, such manual disconnection option is presented via a display of the charging system (e.g., user interface module 122). For example, the manual disconnection option may be presented as a virtual button on the display (e.g., the manual disconnection button 522 discussed below with reference to FIG. 5B), which virtual button may be directly user-selectable if the display is a touchscreen display or may be associated with a separate physical button associated with the display if the display is not a touchscreen display. In some embodiments, the system controller causes the user-selectable button to be presented via the display only when the charging current is disconnected from the charging cable in order to prevent manual disconnection while a charge is present, which would abruptly interrupt the current. In further embodiments, the manual disconnection option is presented during charging, but the manual disconnection option is not selectable by the user or is not active to cause disconnection while charging is ongoing (e.g., the disabled manual disconnection button 512 discussed below with reference to FIG. 5A). For example, a physical user input mechanism (e.g., a physical button) may be present during charging, but signals from such input mechanism may be disregarded while charging is ongoing or may instead cause the charging system to stop charging prior to taking further action to manually disconnect the charging cable.

At block 210, an indication of a user selection of the manual disconnection option is received by the system controller of the charging system in response to a user selecting the manual disconnection option. The system controller may receive an electronic signal from the display or from an input component associated with the display, ether directly or via a system bus of the charging system. When the indication of the user selection is received, the system controller takes one or more actions to disengage the charging cable. In some embodiments, the system controller provides an indication of the user selection of the manual disconnection option to the charge controller in order to cause the charge controller to send a session termination signal to the vehicle charge controller and/or to reset the charge controller. In further embodiments, the system controller controls the charge controller to send such session termination signal and/or to reset the charge controller. In some embodiments, the system controller may also send an error report message to a centralized management system (e.g., centralized management system 150) in order to facilitate analysis and correction of conditions causing error states to occur.

At block 212, in some embodiments, the system controller causes the charge controller to send a session termination signal to the vehicle via a communication connection of the charging cable in response to the user selection of the manual disconnection option. In various embodiments, a session termination command may be sent prior to or as an alternative to a command to reset the charge controller. In some embodiments, the session termination signal may be a required or optional command of a communication protocol for electric vehicle charging (e.g., CCS or CHaDEMO). Such session termination signal may be sent as an electronic signal over a basic control signal connection or a high-level communication connection of the communication connection of the charging cable (e.g., as a pulse width modulated signal over a control pilot connection). In some embodiments, the session termination signal comprises a termination message containing a command readable by a vehicle charge controller that instructs the vehicle charge controller to terminate any active charging sessions. Such termination message may further include instructions to disengage any locking mechanisms of the vehicle charge port, or the termination of active charging sessions by the vehicle charge controller may automatically disengage such locking mechanisms. In some embodiments, the vehicle charge controller may send a response signal to confirm charging session termination, which response message may be automatically generated by the vehicle charge controller or may be requested in the termination message.

At block 214, the system controller causes the charge controller to reset in order to disengage or facilitate disengagement of the charging cable from the vehicle in response to the user selection of the manual disconnection option. The system controller may control the charge controller to reset in various ways. In some embodiments, the system controller causes the charge controller to reset by controlling a power supply to the charge controller in order to cause the charge controller to proceed through a power cycle process in order to reboot the charge controller. This may include activating a soft or hard reboot control of the charger controller. In further embodiments, the system controller causes the charge controller to reset by sending an electronic message to the charge controller indicating the user selection of the manual disconnection option, in response to which the charge controller initiates a shutdown and restart operation. In some such embodiments, the charge controller is configured to send a session termination signal to the vehicle via the charging cable as part of such process, either prior to shutting down or as part of the startup process.

However the system controller causes the charge controller to reset, resetting the charge controller disengages the charging cable from the vehicle. When the charge controller resets, communication with the vehicle charge controller is interrupted, resulting in the vehicle charge controller no longer recognizing an active charging session and releasing the charging cable by disengaging the locking mechanism of the vehicle charge port. Thus, resetting the charge controller automatically terminates any active charging session recognized by either the charge controller or the vehicle charge controller. In some embodiments, resetting the charge controller further automatically disconnects any charging current from the charging cable for safety. For example, the system controller may be configured to control the supply of the charging current to the charging cable only while the system controller receives periodic charging signals from the charge controller during the charging session. If such charging signals are not received for any reason, including the charge controller resetting, the system controller may immediately disconnect the charge current from the charging cable in order to avoid uncontrolled charging. Thus, the exemplary charging cable disengagement method 200 results in the safe and reliable disengagement of the charging cable from the vehicle, even in the event of an error that causes one or both of the charging system or the vehicle to fail to recognize the termination of a charging session. After the charging cable is disengaged, the user may simply unplug the charging cable from the vehicle and return it to a holster of the charging system. Once the charge controller is reset, the charging system returns to its initial state and is ready to begin another charging session.

Figure 3:
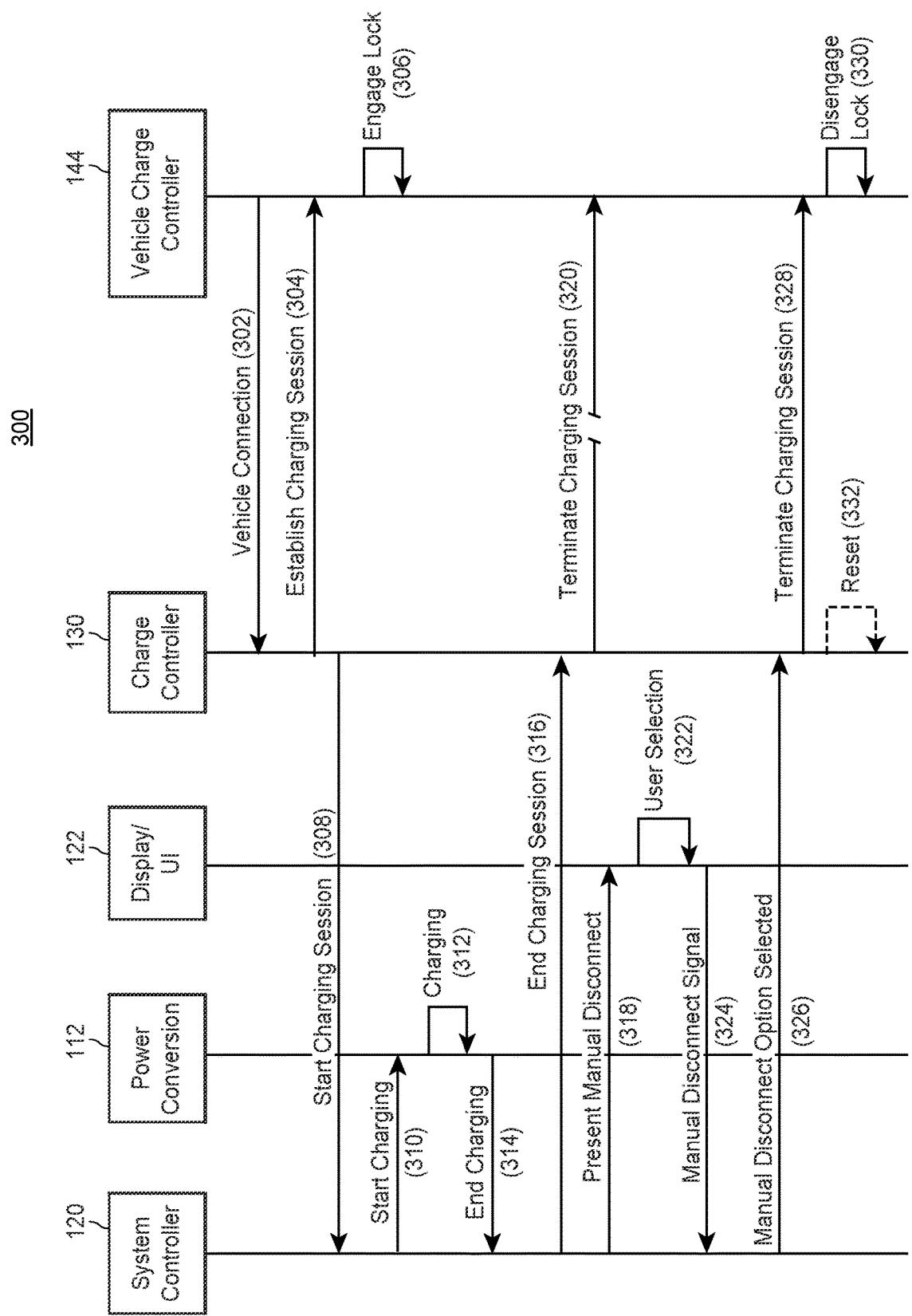
FIG. 3 illustrates a signal diagram of an example of a charging session communication method in accordance with certain aspects disclosed herein.

FIG. 3 illustrates a signal diagram of an example of a charging session communication method 300 for establishing, controlling, and terminating a charging session between an EV charging system 100 and a vehicle 140. The charge controller 130 may communicate with the vehicle charge controller 144 via a communication connection of the coupling 132 (e.g., a charging cable) according to an electronic communication protocol used for vehicle charging (e.g., CCS or CHaDEMO). Upon connection of the vehicle 140 to the EV charging system 100 via the coupling 132, the vehicle charge controller 144 sends a vehicle connection signal 302 to the charge controller 130 advertising its presence. In response to such signal, the charge controller 130 establishes a charging session by sending in response an establish charging session signal 304 to the vehicle charge controller 144. When the vehicle charge controller 144 receives the response establishing the charging session, the charge controller 144 engages a lock to prevent the charging cable from being unplugged during charging (line 306). The charge controller 130 further communicates a start charging session message 308 to the system controller 120 in order to cause the supply of a charging current to the vehicle 140. When the system controller 120 receives such message, it sends a start charging signal 310 to the power conversion module 112 to cause the power conversion module 112 to supply the charging current via a power connection of the coupling 132. The power conversion module 112 then proceeds to continue charging (line 312) until charging is complete, which may be directed by the charge controller 130 via the system controller 120 (through communications not shown). When charging is complete, the power conversion module 112 provides an end charging signal 314 to the system controller 120. Upon identifying the end of charging, the system controller 120 sends an end charging session message 316 to the charge controller 130, in response to which the charge controller 130 attempts to send a session termination signal 320 to the vehicle charge controller 144.

As illustrated, the session termination signal 320 may be interrupted or may otherwise not be received by or recognized by the vehicle charge controller 144. Due to the potential for such errors, the system controller 120 further sends a present manual disconnect signal 318 to the user interface module 122 in order to cause the presentation of a user-selectable manual disconnection option via a display of the user interface module 122. When a user selection 322 of such manual disconnection option is received at the user interface module 122, a manual disconnect signal 324 is sent to the system controller 120. In response to the manual disconnect signal 324, the system controller 120 sends a manual disconnection option selected message 326 to the charge controller 130, which causes the charge controller 130 to again attempt to terminate the charging session by sending a session termination signal 328 to the vehicle charge controller 144. When the vehicle charge controller 144 receives the session termination signal 328, it disengages the lock to release the charging cable (line 330). In some embodiments, the charge controller 130 may reset (line 332) after sending the session termination signal 328, thereby further clearing any error states relating to the charging session.

Additional Descriptions Related to Controllers

Figure 4:
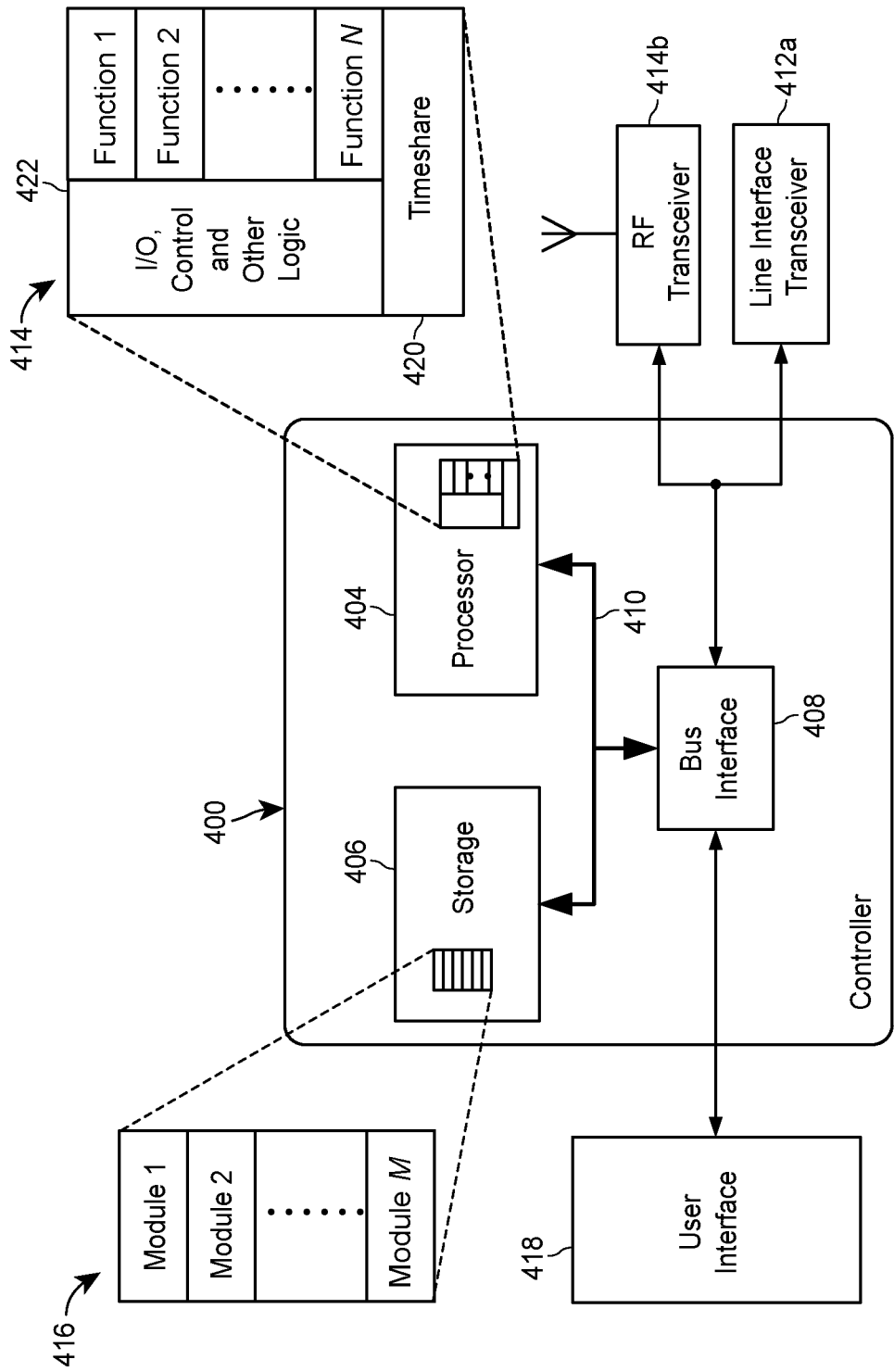
FIG. 4 illustrates a block diagram illustrating a simplified example of a hardware implementation of a controller in accordance with certain aspects disclosed herein.

FIG. 4 illustrates a block diagram illustrating a simplified example of a hardware implementation of a controller 400, such as any of the system controller 120, the charge controller 130, or the vehicle charge controller 144 disclosed herein. The controller 400 may include one or more processors 404 that are controlled by some combination of hardware and software modules. Examples of processors 404 include microprocessors, microcontrollers, digital signal processors (DSPs), application-specific integrated circuits (ASICs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 404 may include specialized processors that perform specific functions, which may be configured by one or more of the software modules 416. The one or more processors 404 may be configured through a combination of software modules 416 loaded during initialization and may be further configured by loading or unloading one or more software modules 416 during operation.

In the illustrated example, the controller 400 may be implemented with a bus architecture, represented generally by the bus 410. The bus 410 may include any number of interconnecting buses and bridges depending on the specific application of the controller 400 and the overall design constraints. The bus 410 links together various circuits including the one or more processors 404 and storage 406. Storage 406 may include memory devices and mass storage devices, any of which may be referred to herein as computer-readable media. The bus 410 may also link various other circuits, such as timing sources, timers, peripherals, voltage regulators, and power management circuits. A bus interface 408 may provide an interface between the bus 410 and one or more line interface circuits 412, which may include a line interface transceiver circuit 412a and a radio frequency (RF) transceiver circuit 412b. A line interface transceiver circuit 412a may be provided for each networking technology supported by the controller. In some instances, multiple networking technologies may share some or all of the circuitry or processing modules found in a line interface circuit 412, such as line interface transceiver circuit 412a for wired communication and RF transceiver circuit 412b for wireless communication. Each line interface circuit 412 provides a means for communicating with various other devices over a transmission medium. In some embodiments, a user interface 418 (e.g., touchscreen display, keypad, speaker, or microphone) may also be provided, and may be communicatively coupled to the bus 410 directly or through the bus interface 408.

A processor 404 may be responsible for managing the bus 410 and for general processing that may include the execution of software stored in a computer-readable medium that may include the storage 406. In this respect, the processor 404 of the controller 400 may be used to implement any of the methods, functions, and techniques disclosed herein. The storage 406 may be used for storing data that is manipulated by the processor 404 when executing software, and the software may be configured to implement any one of the methods disclosed herein.

One or more processors 404 in the controller 400 may execute software. Software may include instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 406 or in an external computer readable medium. The external computer-readable medium and/or storage 406 may include a non-transitory computer-readable medium. A non-transitory computer-readable medium includes, by way of example, a magnetic storage device (e.g., hard disk, floppy disk, magnetic strip), an optical disk, a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Portions of the computer-readable medium or the storage 406 may reside in the controller 400 or external to the controller 400. The computer-readable medium and/or storage 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 406 may maintain software maintained or organized in loadable code segments, modules, applications, programs, etc., which may be referred to herein as software modules 416. Each of the software modules 416 may include instructions and data that, when installed or loaded on the controller 400 and executed by the one or more processors 404, contribute to a run-time image 414 that controls the operation of the one or more processors 404. When executed, certain instructions may cause the controller 400 to perform functions in accordance with certain methods, algorithms, and processes described herein.

Some of the software modules 416 may be loaded during initialization of the controller 400, and these software modules 416 may configure the controller 400 to enable performance of the various functions disclosed herein. For example, some software modules 416 may configure internal devices or logic circuits 422 of the processor 404, and may manage access to external devices such as line interface circuits 412, the bus interface 408, the user interface 418, timers, mathematical coprocessors, etc. The software modules 416 may include a control program or an operating system that interacts with interrupt handlers and device drivers to control access to various resources provided by the controller 400. The resources may include memory, processing time, access to the line interface circuits 412, the user interface 418, etc.

One or more processors 404 of the controller 400 may be multifunctional, whereby some of the software modules 416 are loaded and configured to perform different functions or different instances of the same function. For example, the one or more processors 404 may additionally be adapted to manage background tasks initiated in response to inputs from the user interface 418, the line interface circuits 412, and device drivers. To support the performance of multiple functions, the one or more processors 404 may be configured to provide a multitasking environment, whereby each of a plurality of functions is implemented as a set of tasks serviced by the one or more processors 404 as needed or desired. In one example, the multitasking environment may be implemented using a timesharing program 420 that passes control of a processor 404 between different tasks, whereby each task returns control of the one or more processors 404 to the timesharing program 420 upon completion of any outstanding operations or in response to an input such as an interrupt. When a task has control of the one or more processors 404, the processing circuit is effectively specialized for the purposes addressed by the function associated with the controlling task. The timesharing program 420 may include an operating system, a main loop that transfers control on a round-robin basis, a function that allocates control of the one or more processors 404 in accordance with a prioritization of the functions, or an interrupt-driven main loop that responds to external events by providing control of the one or more processors 404 to a handling function.

Exemplary Display Screens with Manual Disconnection Option

Figure 5A:
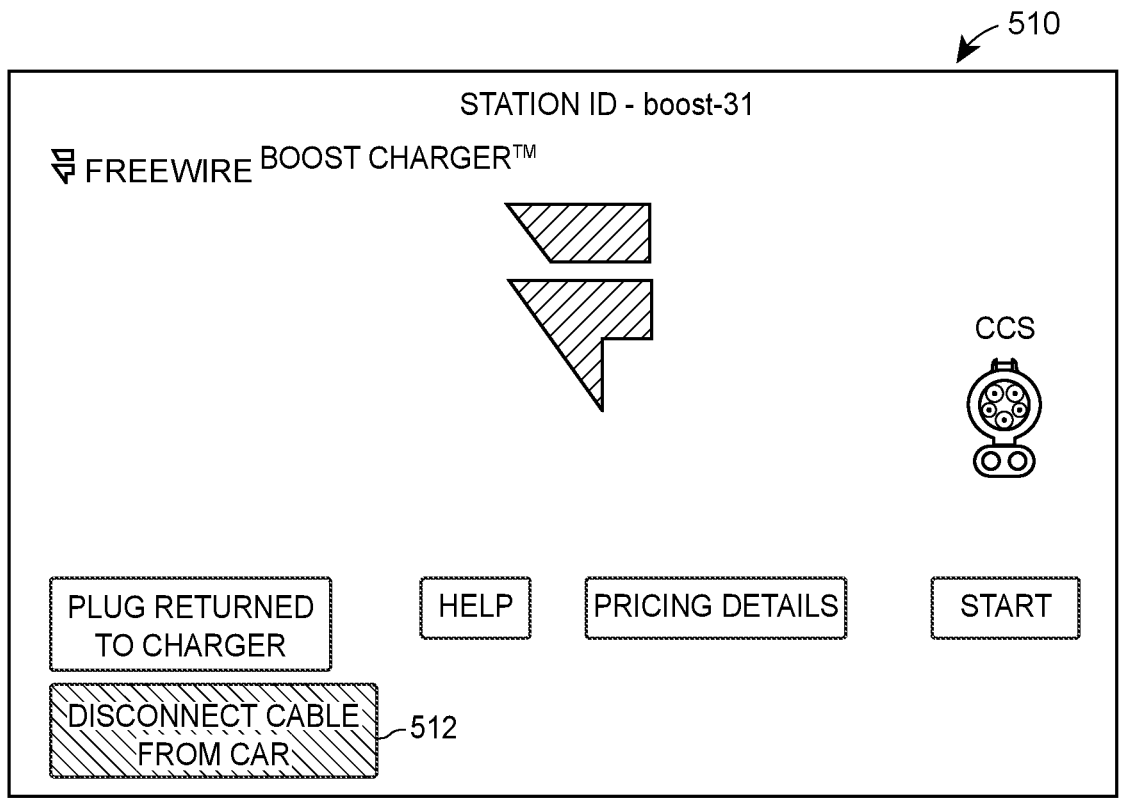
FIGS. 5A-B illustrate examples of display screens of a charging system showing a manual disconnection option presented to a user via a touchscreen display in accordance with certain aspects disclosed herein.
Figure 5B:
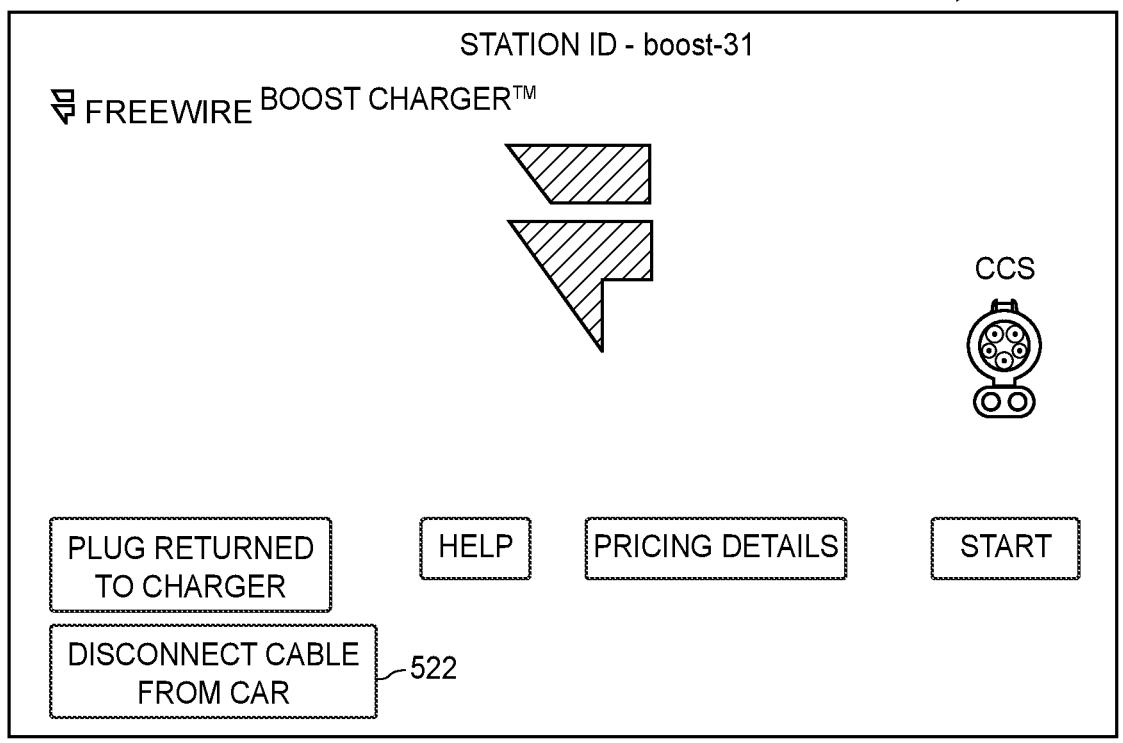

FIGS. 5A-B illustrate examples of display screens of a charging system showing a manual disconnection option presented to a user of the charging system (e.g., EV charging system 100) via a touchscreen display (e.g., user interface 122) of the charging system. FIG. 5A illustrates a display screen 510 of a charging station during charging of a vehicle, displaying various information and options regarding the charging session. The display screen 510 includes a disabled manual disconnection button 512, which is not selectable by a user because the vehicle is currently charging. FIG. 5B illustrates a similar display screen 520 of the charging station when the vehicle is not charging. The display screen 520 presents the same information and options to the user, but the manual disconnection button 522 is no longer disabled because the vehicle is not currently charging. Therefore, a user may select the manual disconnection button 522 in order to cause a manual disengagement of a charging cable, as discussed above.

Other Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. No claim element is to be construed as a means plus function unless the element is expressly recited using the phrase "means for."

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Unless specifically stated otherwise, the term "some" refers to one or more. Likewise, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A vehicle charging system for charging a vehicle, comprising:
   a power input port configured to receive input electrical power from a power source;
   a coupling configured to receive a charging current associated with the input electrical power and to provide an electrical interconnect between the vehicle charging system and the vehicle in order to provide the charging current to the vehicle;
   a display configured to present information to users of the vehicle charging system;
   one or more controllers comprising one or more logic circuits or processors configured to:
      establish a charging session between the vehicle charging system and the vehicle via electronic communication with a vehicle charge controller of the vehicle; and
      control supply of the charging current to the coupling in order to provide the charging current to the vehicle during the charging session; and
      present an indication of a user-selectable manual disconnection option via the display when the charging current is disconnected from the coupling;
      receive an indication of a user selection of the manual disconnection option by operation of a button associated with the manual disconnection option while the charging current is disconnected from the coupling; and
      in response to receiving the indication of the user selection of the manual disconnection option, control at least one controller of the one or more controllers to reset in order to disengage the coupling from the vehicle.

2. The vehicle charging system of claim 1, wherein the display is a touchscreen display and the button is a virtual button presented on the display.

3. The vehicle charging system of claim 1, wherein the button is a mechanical button disposed in proximity to a portion of the display on which the indication of the user-selectable manual disconnection option is presented.

4. The vehicle charging system of claim 1, wherein the indication of the user-selectable manual disconnection option is presented on the display only when the charging current is disconnected from the coupling.

5. The vehicle charging system of claim 1, wherein the coupling comprises a charging cable.

6. The vehicle charging system of claim 1, wherein the at least one controller is configured to reset by proceeding through a power cycle process in order to reboot the at least one controller.

7. The vehicle charging system of claim 1, wherein the one or more controllers are configured such that the charging session automatically terminates when the at least one controller is reset.

8. The vehicle charging system of claim 1, wherein the one or more controllers are further configured to send a session termination signal to the vehicle via electronic communication with the vehicle in response to receiving the indication of the user selection of the manual disconnection option and prior to controlling the at least one controller to reset.

9. The vehicle charging system of claim 1, wherein:
   the one or more controllers comprise a system controller and a charge controller;
   the at least one controller comprises the charge controller;
   the system controller is configured to control the charge controller to reset by causing the charge controller to restart; and
   the charge controller is configured to send a session termination signal to the vehicle via electronic communication with the vehicle charge controller as part of a startup process.

10. A method for charging a vehicle, comprising:
    establishing, by one or more controllers of a vehicle charging system, a charging session between the vehicle charging system and the vehicle via electronic communication with a vehicle charge controller of the vehicle;
    controlling, by the one or more controllers, supply of a charging current to a coupling connecting the vehicle charging system with the vehicle in order to provide the charging current to the vehicle during the charging session;
    presenting, via a display of the vehicle charging system, an indication of a user-selectable manual disconnection option when the charging current is disconnected from the coupling;
    receiving, at the one or more controllers, an indication of a user selection of the manual disconnection option by operation of a button associated with the manual disconnection option while the charging current is disconnected from the coupling; and in response to receiving the indication of the user selection of the manual disconnection option, controlling, by the one or more controllers, at least one controller of the one or more controllers to reset in order to disengage the coupling from the vehicle.

11. The method of claim 10, wherein the display is a touchscreen display and the button is a virtual button presented on the display.

12. The method of claim 10, wherein the button is a mechanical button disposed in proximity to a portion of the display on which the indication of the user-selectable manual disconnection option is presented.

13. The method of claim 10, wherein the indication of the user-selectable manual disconnection option is presented on the display only when the charging current is disconnected from the coupling.

14. The method of claim 10, wherein the at least one controller is configured to reset by proceeding through a power cycle process in order to reboot the at least one controller.

15. A tangible, non-transitory computer-readable medium storing executable instructions for charging a vehicle that, when executed by one or more controllers of a vehicle charging system, cause the vehicle charging system to:
    establish a charging session between the vehicle charging system and the vehicle via electronic communication with a vehicle charge controller of the vehicle; and
    control supply of a charging current to a coupling connecting the vehicle charging system with the vehicle in order to provide the charging current to the vehicle during the charging session; and
    present an indication of a user-selectable manual disconnection option via a display of the vehicle charging system when the charging current is disconnected from the coupling;
    receive an indication of a user selection of the manual disconnection option by operation of a button associated with the manual disconnection option while the charging current is disconnected from the coupling; and
    in response to receiving the indication of the user selection of the manual disconnection option, control at least one controller of the one or more controllers to reset in order to disengage the coupling from the vehicle.

16. The tangible, non-transitory computer-readable medium of claim 15, wherein the display is a touchscreen display and the button is a virtual button presented on the display.

17. The tangible, non-transitory computer-readable medium of claim 15, wherein the executable instructions further cause the vehicle charging system to:
    determine the charging current is disconnected from the coupling; and
    present the indication of the user-selectable manual disconnection option on the display in response to determining the charging current is disconnected from the coupling.

18. The tangible, non-transitory computer-readable medium of claim 15, wherein the executable instructions cause the vehicle charging system to control the at least one controller to reset by proceeding through a power cycle process in order to reboot the at least one controller.

19. The tangible, non-transitory computer-readable medium of claim 15, wherein the executable instructions further cause the vehicle charging system to terminate the charging session automatically when the at least one controller is reset.

20. The tangible, non-transitory computer-readable medium of claim 15, wherein the executable instructions further cause the vehicle charging system to send, from the one or more controllers to the vehicle charge controller via the coupling, a session termination signal in response to receiving the indication of the user selection of the manual disconnection option and prior to controlling the at least one controller to reset.

* * * * *